US010154525B2

(12) United States Patent
Kuo et al.

(10) Patent No.: US 10,154,525 B2
(45) Date of Patent: Dec. 11, 2018

(54) METHOD AND APPARATUS FOR TRIGGERING RADIO BEARER RELEASE BY A RELAY UE (USER EQUIPMENT) IN A WIRELESS COMMUNICATION SYSTEM

(71) Applicant: ASUSTeK Computer Inc., Taipei (TW)

(72) Inventors: Richard Lee-Chee Kuo, Taipei (TW); Wei Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 67 days.

(21) Appl. No.: 15/258,358

(22) Filed: Sep. 7, 2016

(65) Prior Publication Data

US 2017/0071028 A1 Mar. 9, 2017

Related U.S. Application Data

(60) Provisional application No. 62/215,398, filed on Sep. 8, 2015.

(51) Int. Cl.
*H04W 76/12* (2018.01)
*H04W 76/14* (2018.01)
(Continued)

(52) U.S. Cl.
CPC ........... *H04W 76/062* (2013.01); *H04W 8/06* (2013.01); *H04W 76/12* (2018.02); *H04W 76/14* (2018.02);
(Continued)

(58) Field of Classification Search
CPC ... H04W 76/062; H04W 8/06; H04W 76/022; H04W 76/023; H04W 76/046
See application file for complete search history.

(56) References Cited

U.S. PATENT DOCUMENTS

2011/0280122 A1* 11/2011 Matsumoto ............ H04L 41/06
370/225
2012/0025060 A1   2/2012 Iwata
(Continued)

FOREIGN PATENT DOCUMENTS

JP   2015088851   7/2015
WO   2015068732   5/2015

OTHER PUBLICATIONS

Nokia Networks, Ericsson, Intel, Samsung, ZTE,"General Description for UE-to-Network Relay," S2-152774, 3GPP SA WG2 Meeting #110AH, Sophia Antipolis, France, Aug. 31-Sep. 3, 2015.
(Continued)

*Primary Examiner* — Ronald B Abelson
(74) *Attorney, Agent, or Firm* — Blue Capital Law Firm, P.C.

(57) ABSTRACT

A method and apparatus for triggering radio bearer release by a relay UE in a wireless communication system are disclosed. In one embodiment, the method includes the relay UE connects with an eNB. The method also includes the relay UE establishes a PDN connection for supporting traffic relaying. The method further includes the relay UE establishes a layer-2 link with a remote UE. In addition, the method includes the relay UE creates a radio bearer between the relay UE and the eNB for forwarding data packets between the remote UE and a PDN corresponding to the PDN connection. Furthermore, the method includes the relay UE sends a NAS message to the eNB if a failure of the layer-2 link is detected. And the method includes the relay UE receives a RRC message indicating release of the radio bearer in response to transmission of the NAS message from the eNB.

18 Claims, 13 Drawing Sheets

(51) Int. Cl.
- H04W 76/27 (2018.01)
- H04W 76/32 (2018.01)
- H04W 8/06 (2009.01)
- H04W 76/06 (2009.01)
- H04W 88/04 (2009.01)
- H04L 29/08 (2006.01)
- H04W 76/18 (2018.01)
- H04W 76/25 (2018.01)

(52) U.S. Cl.
CPC ........... *H04W 76/27* (2018.02); *H04W 76/32* (2018.02); *H04L 69/324* (2013.01); *H04W 76/18* (2018.02); *H04W 76/25* (2018.02); *H04W 88/04* (2013.01)

(56) References Cited

U.S. PATENT DOCUMENTS

| | | | |
|---|---|---|---|
| 2013/0028701 | A1 | 1/2013 | Pragada |
| 2014/0036873 | A1* | 2/2014 | Cheng ............... H04W 36/0022 370/331 |
| 2017/0071021 | A1* | 3/2017 | Jin ...................... H04W 76/025 |

OTHER PUBLICATIONS

Intel, Samsung, ZTE,"Introduction to One-to-one ProSe Direct Communication Procedures," S2-152773, 3GPP SA WG2 Meeting #110AH, Sophia Antipolis, France, Aug. 31-Sep. 3, 2015.

3GPP TR 23.703, V12.0.0, Feb. 2014, 3rd Generation Partnership Project; Technical Specification Group Services and System Aspects; Study on architecture enhancements to support Proximity-based Services (ProSe) (Release 12), Chapter 6.3.3,6.3.10, pp. 1-12.

Office Action from corresponding TW Application No. 105129004, dated Apr. 25, 2017.

3GPP Standard; 3GPP TR 23.703, v12.0.0. (Feb. 2014) "3rd Generation Partnership Project; Technical Specification Group Services and System Aspects; Study on architecture enhancements to support Proximity-based Services" (ProSe) (Release 12). 12 Page Only.

3GPP TR 23.713 v1.5.0 (Jul. 2015), "3rd Generation Partnershop Project; Technical Specification Group Services and System Aspects; Study on extended architecture support for proximity-based Services (Release 13)". 4 Page Only.

3GPP TS 23.303 v13.0.0 (Jun. 2015), 3rd Generation Partnershop Project; Technical Specification Group Services and System Aspects; Proximity-based Services(ProSe); Stage 2 (Release 13). 5 Page Only.

3GPP TS 23.401 v13.3.0 (Jun. 2015), 3rd Generation Partnership Project; Technical Specification Group Services and System Aspects; General Packet Radio Service (GPRS) enhancements for Evolved Universal Terrestrial Radio Access Network (E-UTRAN) access (Release 13). 9 Page Only.

SA WG2 Meeting #110AH, Aug. 31-Sep. 3, 2015, Sophia Antipolis, France, S2152773.

SA WG2 Meeting #110AH, Aug. 31-Sep. 3, 2015, Sophia Antipolis, France, S2-152774.

European Search Report from corresponding European Patent Application No. 16187355.9, dated Jan. 17, 2017.

3GPP, TS23.713 V1.5, 3GPP, 3rd Generation Partnership Project, dated Jul. 28, 2015.

Office Action from Japan Patent Office in the corresponding JP Application No. 2016-175100, dated Apr. 10, 2018.

* cited by examiner

METHOD AND APPARATUS FOR TRIGGERING RADIO BEARER RELEASE BY A RELAY UE (USER EQUIPMENT) IN A WIRELESS COMMUNICATION SYSTEM

CROSS-REFERENCE TO RELATED APPLICATIONS

The present application claims the benefit of U.S. Provisional Patent Application Ser. No. 62/215,398 filed on Sep. 8, 2015, the entire disclosure of which is incorporated herein in their entirety by reference.

FIELD

This disclosure generally relates to wireless communication networks, and more particularly, to a method and apparatus for triggering radio bearer release by a relay UE (User Equipment) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus for triggering radio bearer release by a relay UE in a wireless communication system are disclosed. In one embodiment, the method includes the relay UE connects with an evolved Node-B (eNB). The method also includes the relay UE establishes a Packet Data Network (PDN) connection for supporting traffic relaying. The method further includes the relay UE establishes a layer-2 link with a remote UE. In addition, the method includes the relay UE creates a radio bearer between the relay UE and the eNB for forwarding data packets between the remote UE and a PDN corresponding to the PDN connection. Furthermore, the method includes the relay UE sends a non-access stratum (NAS) message to the eNB if a failure of the layer-2 link is detected. And the method includes the relay UE receives a radio resource control (RRC) message indicating release of the radio bearer in response to transmission of the NAS message from the eNB.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support the wireless technology discussed in the various documents, including: "DOCOMO 5G White Paper" by NTT Docomo, Inc. and METIS Deliverable D2.4, "Proposed solutions for new radio access". Furthermore, the exemplary wireless communication systems devices described below may be designed to support one or more standards such as the standard offered by a consortium named "3rd Generation Partnership Project" referred to herein as 3GPP, including: TS 23.303 v13.0.0, "Proximity-based services (ProSe)"; TR 23.713 v1.5.0, "Study on extended architecture enhancements to support for proximity-based services"; TS 36.300 v12.5.0, "E-UTRA and E-UTRAN Overall description"; GSMA™-VoLTE Service Description and Implementation Guidelines Version 1.1 (26 Mar. 2014); TS 36.331 v12.5.0, "E-UTRAN Radio Resource Control (RRC) Protocol specification". The standards and documents listed above are hereby expressly incorporated by reference in their entirety.

Figure 1:
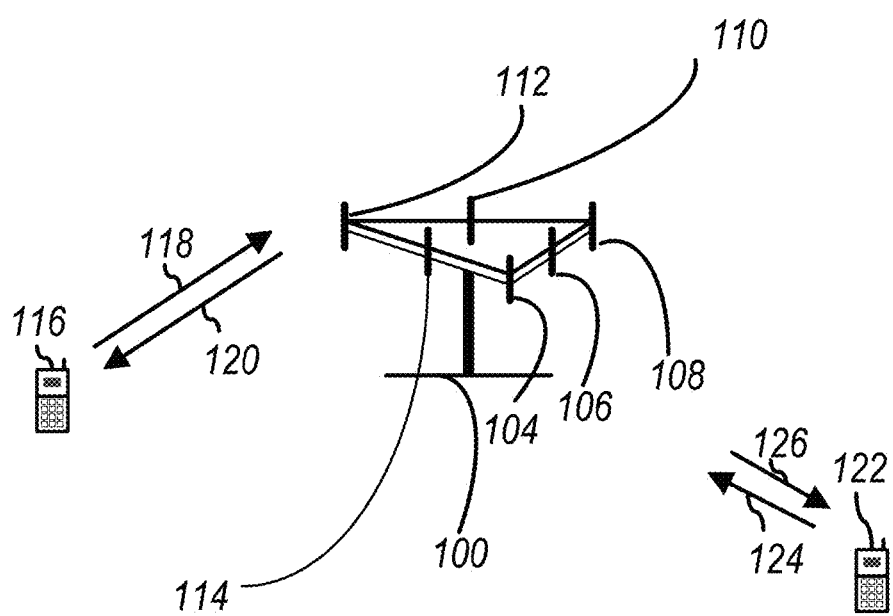
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
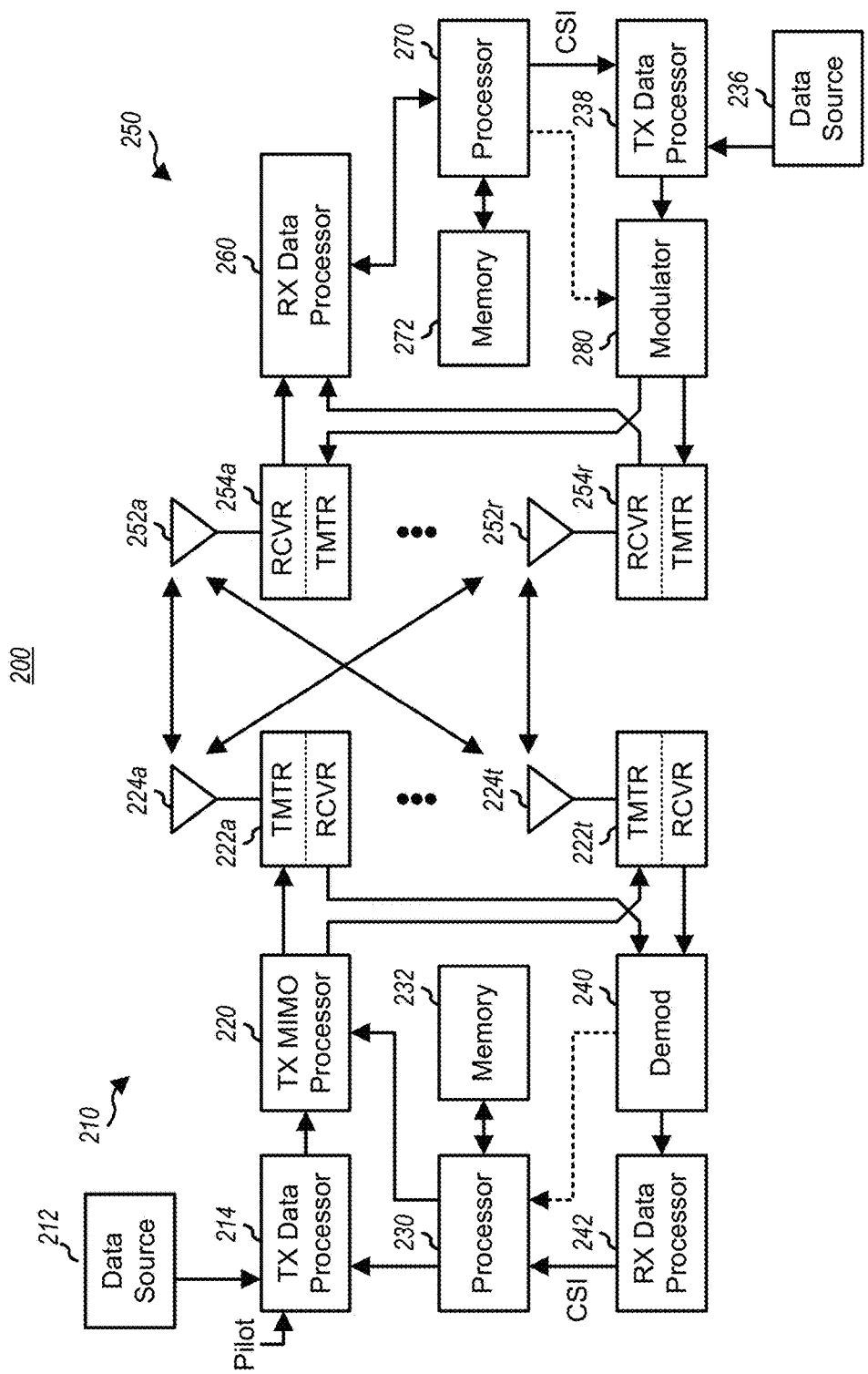
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
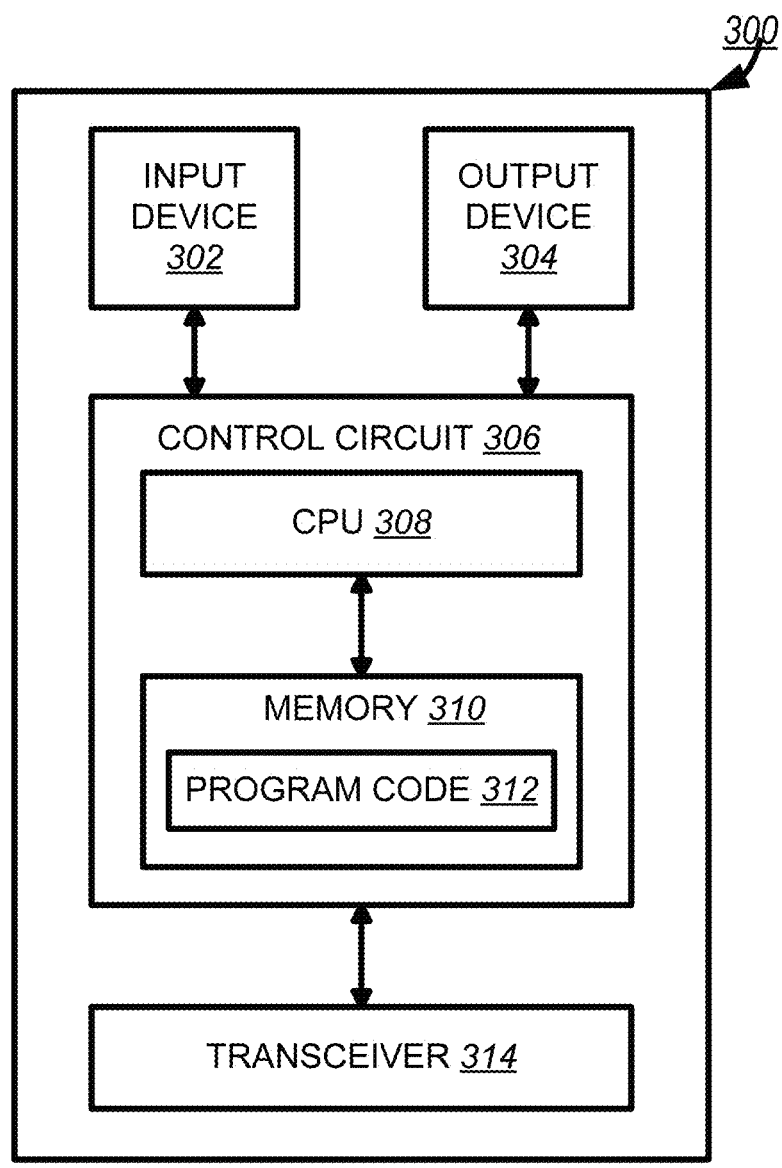
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
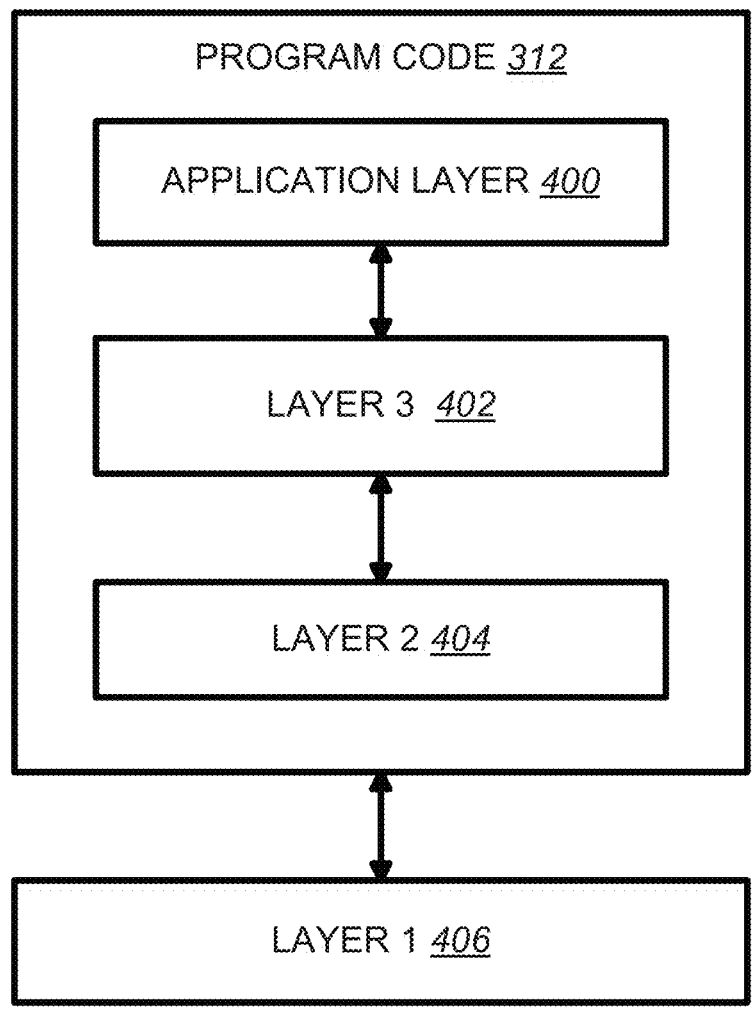
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.303 v13.0.0 describes a ProSe (Proximity-based Services) UE-to-Network Relay as follows:

4.4.3 ProSe UE-to-Network Relay

The ProSe UE-to-Network Relay entity provides the functionality to support connectivity to "unicast" services for Remote UEs that are not "served by E-UTRAN" (see FIG. 4.4.3-1).

Figure 5:
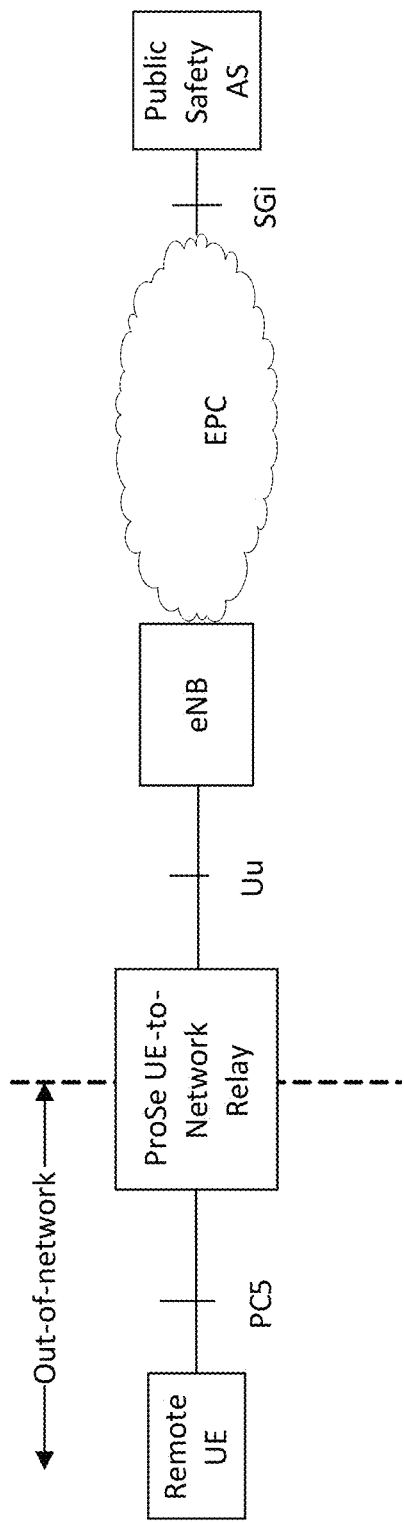
FIG. 5 is a reproduction of FIG. 4.4.3-1 of 3GPP TS 23.303 v13.0.0.

[FIG. 4.4.3-1 of 3GPP TS 23.303 v13.0.0 is reproduced as FIG. 5]

The ProSe UE-to-Network Relay shall relay unicast traffic (UL and DL) between the Remote UE and the network. The ProSe UE-to-Network Relay shall provide generic function that can relay any type of traffic that is relevant for public safety communication.

NOTE 1: There is no support for relaying eMBMS traffic from Uu interface to PC5 in this release of the specification.

NOTE 2: The IP Address preservation is not supported when the Remote UE moves out of the ProSe UE-to-Network Relay coverage.

One-to-one Direct Communication between Remote UEs and ProSe UE-to-Network Relays has the following characteristics:

Communication over PC5 reference point is connectionless.

ProSe Bearers are bi-directional. IP packets passed to the radio layers on a given ProSe bearer will be transmitted by the physical layer with the associated L2 destination address. IP packets passed up from the radio layers on the same ProSe bearer will have been received over the air addressed to the same L2 destination.

4.5.4 ProSe UE-to-Network Relaying

ProSe UE-to-Network Relaying shall include the following functions:

ProSe Direct discovery following Model A or Model B can be used in order to allow the Remote UE to discover ProSe UE-to-Network Relay(s) in proximity.

ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.

Act as an "announcing" or "discoveree" UE on the PC5 reference point supporting direct discovery.

Act as a default router to the Remote UEs forwarding IP packets between the UE-ProSe UE-to-Network Relay point-to-point link and the corresponding PDN connection.

Handle Router Solicitation and Router Advertisement messages as defined in IETF RFC 4861[10].

Act as DHCPv4 Server and stateless DHCPv6 Relay Agent.

Act as a NAT if IPv4 is used replacing the locally assigned IPv4 address of the Remote UE with its own.

Map the L2 link ID used by the Remote UE as Destination Layer-2 ID to the corresponding PDN connection supported by the ProSe UE-to-Network Relay.

NOTE: The aspects of the radio layers for the PC5 reference point are defined in RAN specifications.

Figure 6:
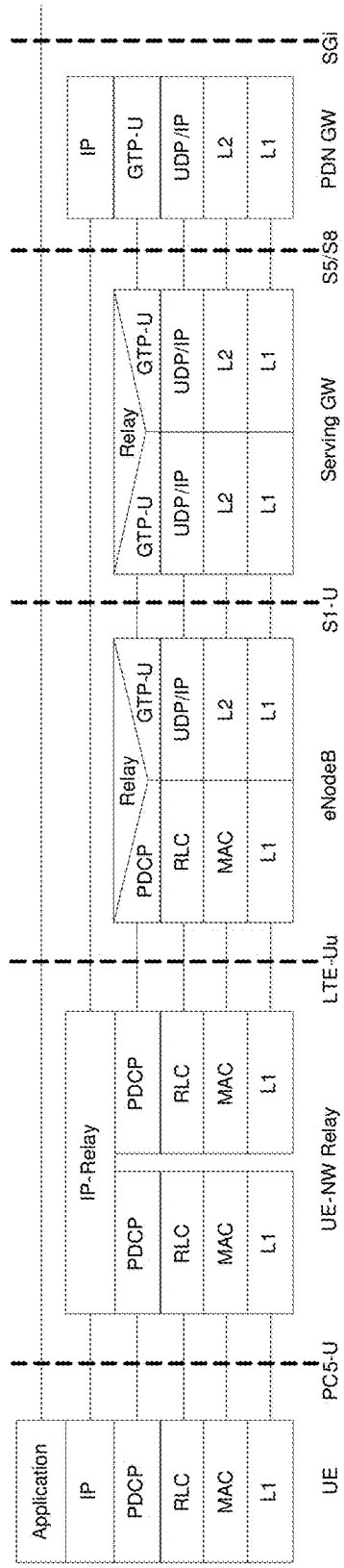
FIG. 6 is a reproduction of FIG. 5.1.2.2-1 of 3GPP TS 23.303 v13.0.0.

3GPP TS 23.303 v13.0.0 also specifies the user plane for UE-UE-to-Network Relay as follows:

[FIG. 5.1.2.2-1 of 3GPP TS 23.303 v13.0.0 is reproduced as FIG. 6]

Legend:

GPRS Tunnelling Protocol for the user plane (GTP-U): This protocol tunnels user data between eNodeB and the S-GW as well as between the S-GW and the P-GW in the backbone network. GTP shall encapsulate all end user IP packets.

MME controls the user plane tunnel establishment and establishes User Plane Bearers between eNodeB and S-GW.

UDP/IP: These are the backbone network protocols used for routing user data and control signalling.

LTE-Uu: The radio protocols of E-UTRAN between the UE and the eNodeB are not specified in TS 36.300 [17].

PC5-U: The radio protocols of E-UTRAN between the UE and the UE-to-Network Relay are specified in this Release.

Editor's Note: Access Stratum stack to be reviewed and finally decided in RAN WGs.

3GPP TR 23.713 v1.5.0 specifies a solution for direct discovery and a solution for one-to-one ProSe direct communication as follows:

6.1 Solution for Direct Discovery (Public Safety Use)

6.1.1 Functional Description 6.1.1.1 General

Both Model A and Model B discovery are supported:

Model A uses a single discovery protocol message (Announcement).

Model B uses two discovery protocol messages (Solicitation and Response).

Public Safety discovery for ProSe UE-Network Relay discovery and Group Member discovery uses the PC5-D protocol stack that is depicted in FIG. 6.1.1.1-1.

Additional information not directly used for discovery can be also advertised using Discovery Transport, like relayed TMGIs, the ECGI of the service cell, in a single or separate discovery messages of type "Relay Discovery Additional Information".

Figure 7:
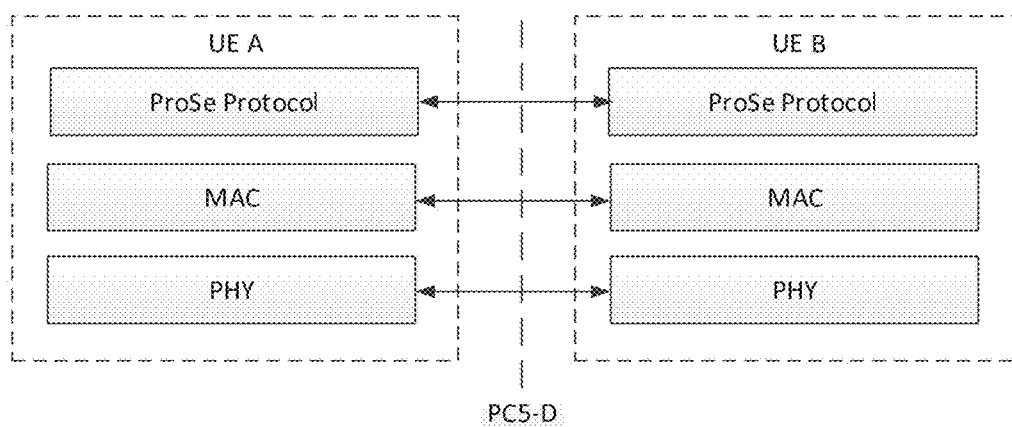
FIG. 7 is a reproduction of FIG. 6.1.1.1-1 of 3GPP TR 23.713 v.1.5.0.

[FIG. 6.1.1.1-1 is reproduced as FIG. 7]

New PC5-D ProSe Protocol messages will need to be defined in TS 24.334:—UE-to-Network Relay Discovery Announcement message (Model A)

UE-to-Network Relay Discovery Solicitation message (Model B)

UE-to-Network Relay Discovery Response message (Model B)

Group Member Discovery Announcement message (Model A)

Group Member Discovery Solicitation message (Model B)

Group Member Discovery Response message (Model B)

6.1.2 Procedures 6.1.2.1 General

The following use cases for public safety discovery are supported:

UE-to-Network Relay Discovery.

Determination is needed regarding within the ProSe Communication which user(s) are in ProSe Communication range at any given time (shortly referred to as "Group Member Discovery").

UE-to-UE Relay Discovery.

The following parameters are common to all of UE-to-Network Relay Discovery, Group Member Discovery and UE-to-UE Relay Discovery:

Message type: Announcement (Model A) or Solicitation/Response (Model B), Relay Discovery Additional Information (Model A).

Discovery type: indicates whether this is UE-to-Network Relay Discovery, Group Member Discovery or UE-to-UE Relay Discovery.

The following parameters are used in the UE-to-Network Relay Discovery Announcement message (Model A):

ProSe Relay UE ID: link layer identifier that is used for direct communication and is associated with a Relay Service Code.

Announcer info: provides information about the announcing user.

Relay Service Code: parameter identifying a connectivity service the ProSe UE-to-Network Relay provides to Public Safety applications. The Relay Service Codes are configured in a ProSe UE-to-Network relay for advertisement. Additionally, the Relay Service Code also identifies authorized users the ProSe UE-to-Network relay would offer service to, and may select the related security policies or information e.g. necessary for authentication and authorization between the Remote UE and the ProSe UE-to-Network Relay (e.g. a Relay Service Code for relays for police members only would be different than a Relay Service code for relays for Fire Fighters only, even though potentially they provided connectivity to same APN e.g. to support Internet Access). The definition of values of the Relay Service Code are out of scope of ProSe specification.

Radio Layer Information: contains information about the radio layer information, e.g. radio conditions between the eNB and the UE-to-Network Relay, to assist the Remote UE selecting the proper UE-to-Network Relay.

Editor's Note: The details of Radio Layer Information parameters are to be identified and if agreed then to be defined by RAN WGs.

NOTE 1: A ProSe Relay UE ID should be uniquely associated with a Relay Service Code.

NOTE 2: ProSe Relay UE ID in the announcement message does not imply that the ProSe UE-to-Network Relay has established the indicated connectivity to the network.

The following parameters are used in the UE-to-Network Relay Discovery Solicitation message (Model B):

Discoverer info: provides information about the discoverer user.

Relay Service Code: information about connectivity that the discoverer UE is interested in. The Relay Service Codes are configured in the Prose Remote UEs interested in related connectivity services.

ProSe UE ID: link layer identifier of the discoverer that is used for direct communication (Model B).

The following parameters are used in the UE-to-Network Relay Discovery Response message (Model B):

ProSe Relay UE ID: link layer identifier that is used for direct communication and is associated with a Relay Service Code.

NOTE 3: It is up to stage 3 specifications how the ProSe UE-to-Network Relay indicates in the response message which Relay Service Code it can support.

NOTE 4: a ProSe Relay UE ID should be uniquely associated with a Relay Service Code.

NOTE 5: ProSe Relay UE ID in the response message does not imply that the ProSe UE-to-Network Relay has established the indicated connectivity to the network.

Discoveree info: provides information about the discoveree.

Radio Layer Information: contains information about the radio layer information, e.g. radio conditions between the eNB and the UE-to-Network Relay, to assist the Remote UE selecting the proper UE-to-Network Relay.

Editor's Note: The details of Radio Layer Information parameters are to be identified and if agreed then to be defined by RAN WGs.

The following parameters are used in the Group Member Discovery Announcement message (Model A):

ProSe UE ID: link layer identifier that is used for subsequent direct communication.

Announcer info: provides information about the announcing user.

The following parameters are used for Group Member Discovery Solicitation message (Model B):

Source ProSe UE ID: link layer identifier of the source UE that is used for subsequent direct communication.

Discoverer info: provides information about the discoverer user.

Target Info: provides information about the targeted discoverees (single user or group).

The following parameters are used for Group Member Discovery Response message (Model B):

ProSe UE ID: link layer identifier that is used for subsequent direct communication.

Discoveree info: provides information about the discoveree.

The following parameters are used for UE-to-UE Relay Discovery:

ProSe UE ID: link layer identifier that is used for direct communication.

Announcer/Discoverer info: provides information about the announcing or discoverer user.

Remote User Info: provides information about the user of a Remote UE.

Discoveree info (Model B): provides information about the discoveree.

The following parameters can be used in Relay Discovery Additional Information:

ProSe Relay UE ID: link layer identifier that is used for direct communication and is associated with a Relay Service Code.

Announcer info: provides information about the announcing user.

TMGI: indicates the MBMS service the ProSe UE-Network Relay is relaying

ProSe Layer-2 Group ID: link layer identifier of the group that transmits the MBMS traffic corresponding to the TMGI.

ECGI: indicates the ECGI of the serving cell of the ProSe UE-Network Relay

A single Relay Discovery Additional Information Message may carry:

the EGCI that the ProSe UE-Network Relay is camped on or;

one or more advertised TMGIs and their corresponding ProSe Layer-2 Group IDs up to the maximum allowed message size or;

the EGCI that the ProSe UE-Network Relay is camped on and one or more advertised TMGIs and their corresponding ProSe Layer-2 Group IDs up to the maximum allowed message size.

The following parameters have a fixed size of maximum 64 bits: Announcer Info, Discoverer Info, Discoveree Info and Target Info. The definition of these parameters is out of ProSe scope.

NOTE 6: The size of these parameters is to be reviewed during Stage 3 work.

NOTE 7: Any mapping between application layer user identifiers of larger size to the fixed size of Announcer/Discoverer/Discoveree Info or Target Info is out of ProSe scope.

The Announcer Info, Discoverer Info and Discoveree Info refer to the same parameter that takes on a different name depending on the Public Safety Discovery message. It is provided to the UE during provisioning time (e.g. similar to how ProSe Layer-2 Groups are provisioned in Rel-12).

The Relay Service Code(s) are provided to the UE and ProSe UE-to-Network Relay during provisioning time (e.g. similar to how ProSe Layer-2 Groups are provisioned in Rel-12). It is assumed that the remote UEs are provisioned in advance with the Relay Service Codes corresponding to the ProSe UE-Network Relays they are allowed to access.

The following are the provisioning options for Announce Info/Discoverer Info/Discoveree Info and Relay Service Code:

Configuration in the UICC.

Provisioning in the ME from the Direct Provisioning Function (DPF).

Provisioning in the ME from a 3rd party public safety provider application server (e.g. GCS AS in TS 23.468 [15]). If UE receives the same set of data from AS that has been previously provided by DPF then UE uses the data set provided by AS.

The Target Info parameter is not provisioned in the UE. It is provided by the application layer in the UE (e.g. manually selected by the user from a contacts list).

6.1.2.2 UE-Network Relay Discovery

6.1.2.2.1 Model A

Depicted in FIG. 6.1.2.2.1.1 is the procedure for Relay discovery Model A.

Figure 8:
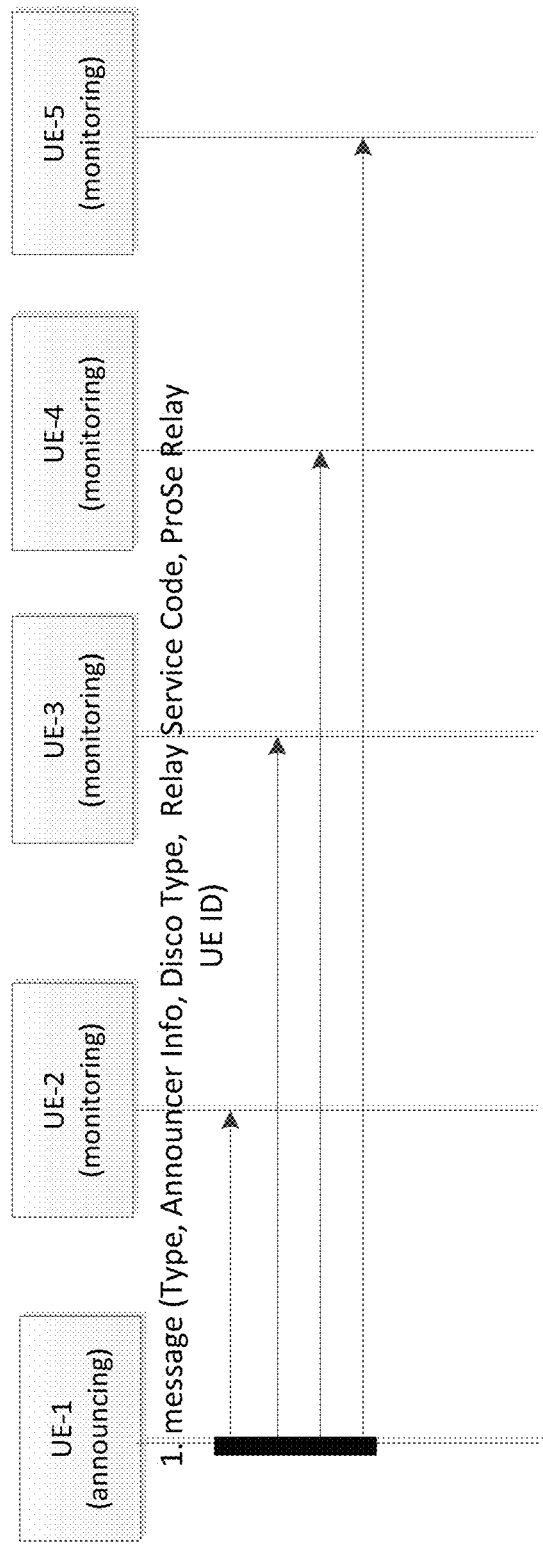
FIG. 8 is a reproduction of FIG. 6.1.2.2.1.1 of 3GPP TR 23.713 v1.5.0.

[FIG. 6.1.2.2.1.1 of 3GPP TR 23.713 v1.5.0 is reproduced as FIG. 8]

Step 1:
  Type=Announcement
  Discovery Type=UE-NW Relay Discovery

6.1.2.2.2 Model B

Depicted in FIG. 6.1.2.2.2.1 is the procedure for Relay discovery Model B.

Figure 9:
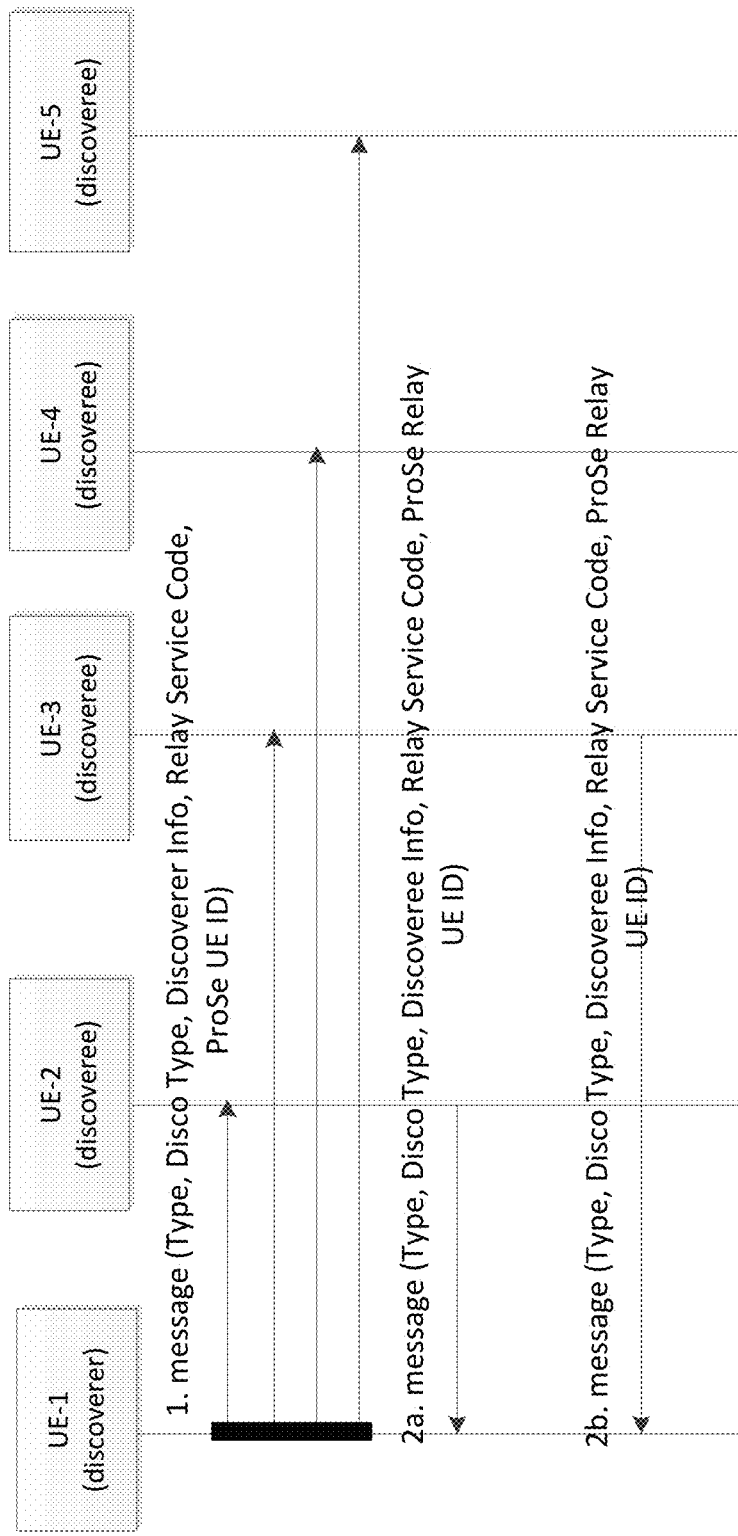
FIG. 9 is a reproduction of FIG. 6.1.2.2.2.1 of 3GPP TR 23.713 v1.5.0.

[FIG. 6.1.2.2.2.1 of 3GPP TR 23.713 v1.5.0 is reproduced as FIG. 9]

Step 1:
  Type=Solicitation
  Discovery Type=UE-NW Relay Discovery
Step 2:
  Type=Response
  Discovery Type=UE-NW Relay Discovery
  ...

7.1 Solution for One-to-One ProSe Direct Communication

Editor's note: This clause is intended to document the agreed architecture solution for one-to-one ProSe Direct Communication.

7.1.1 Functional Description

Editor's note: General description, assumptions, and principles of the solution.

7.1.1.1 General

ProSe direct communication one-to-one is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link.

NOTE: Conflicts between Destination Layer-2 ID for unicast and one-to-many communication will be resolved by RAN2 WG.

The UE needs to ensure that the Layer-2 ID for unicast communication is at least locally unique. So the UE should be prepared to handle Layer-2 ID conflicts with adjacent UEs using unspecified mechanisms (e.g. self-assign a new Layer-2 ID for unicast communication when a conflict is detected).

The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

7.1.1.2 PC5 Signalling Protocol

A PC5 Signalling Protocol is used for control plane signalling over PC5. The PC5 Signalling Protocol stack is illustrated in FIG. 7.1.1.2.1. The SDU Type field (3 bits) in the PDCP header is used to discriminate between IP, ARP and "PC5 Signalling Protocol".

Editor's note: The use of PC5 Signalling Protocol as described in this clause is a working assumption and needs to be reconfirmed.

Figure 10:
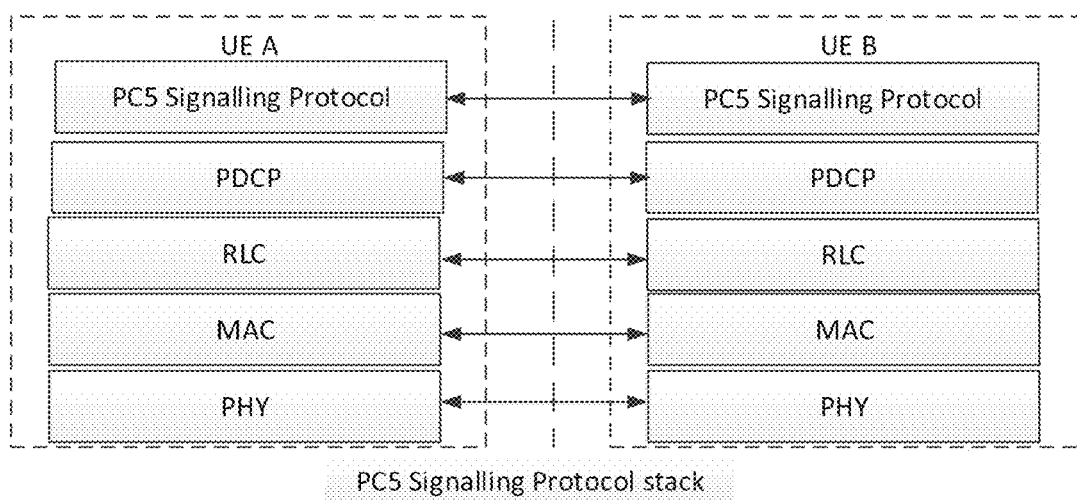
FIG. 10 is a reproduction of FIG. 7.1.1.2.1 of 3GPP TR 23.713 v1.5.0.

[FIG. 7.1.1.2.1 of 3GPP TR 23.713 v1.5.0 is reproduced as FIG. 10]

PC5 Signalling Protocol messages may be sent on a unicast Destination Layer-2 ID.

The following functionality is enabled by the PC5 Signalling Protocol:

1:1 ProSe Communication: Direct Communication Request message (Step 1 in FIG. 7.1.2.1.1), potentially including the subsequent messages.

TMGI advertisement and eMBMS traffic relay: defined in clause 7.2.2.2, and specifically, TMGI Monitoring Request and Response messages Cell ID announcement procedure: defined in clause 7.2.2.3, and specifically Cell ID Announcement Request/Response messages.

7.1.2 Procedures

Editor's note: Describes the high-level operation, procedures and information flows for the solution.

ProSe direct communication one-to-one is composed of the following procedures:

Establishment of a secure layer-2 link over PC5.
IP address/prefix assignment.
Layer-2 link maintenance over PC5.
Layer-2 link release over PC5.

7.1.2.1 Establishment of Secure Layer-2 Link Over PC5

Depicted in FIG. 7.1.2.1.1 is the procedure for establishment of secure layer-2 link over PC5. The message includes the User Info-1 parameter that is used to assert the identity of the UE-1's user. UEs engaged in isolated (non-relay) one to one communication may negotiate the link-local address to be used for subsequent communication.

Figure 11:
FIG. 11 is a reproduction of FIG. 7.1.2.1.1 of 3GPP TR 23.713 v1.5.0.

[FIG. 7.1.2.1.1 of 3GPP TR 23.713 v1.5.0 is reproduced as FIG. 11]

1. UE-1 sends a Direct Communication Request message to UE-2 in order to trigger mutual authentication. If link local address is used, UE 1 includes the configured link-local address in the Direct Communication Request message. UE 1 may include both an IPv4 address and an IPv6 address in the message to facilitate that UE 2 can choose the address of the IP version it supports, > NOTE 1: The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.
>
> NOTE 2: "Secure layer-2 link" implies at least mutual authentication between the two users. Whether bearer level confidentiality or integrity protection over PC5 is mandatory or not is in SA3 scope.

2. UE-2 initiates the procedure for mutual authentication. As part of this step UE-2 includes the User Info-2 parameter that is used to assert the identity of the UE-2's user. The successful completion of the authentication procedure indicates the establishment of the secure layer-2 link over PC5. UE 2 checks whether it supports the link local address of IP version indicated in step 1. If it supports, UE 2 responds a Direct Communication Response (link-local address of UE 2) message.

> Editor's note: It is FFS whether User Info parameter used in this procedure is the same as the Announcer/Discoverer/Discoveree Info parameter used in the Public Safety Discovery procedures. It depends on the asserted identity that will be defined in the security procedures in SA3.

7.1.2.2 IP Address Assignment

At least the following standard IETF mechanisms are used for IP address/prefix assignment:

> DHCP based IP address configuration for assignment of IPv4 address.
>
> IPv6 Stateless Address auto configuration specified in RFC 4862 [6] for assignment of IPv6 prefix.

One of the two UEs acts as DHCP server or IPv6 default router.

In the ProSe UE-NW Relay case the relay acts as DHCP server or IPv6 default router for all Remote UEs that connect to it over a secure layer-2 link over PC5, detail procedures are described in clause 7.2.2.1.

UEs engaging in isolated (non-relay) one-to-one communication may also use link-local addresses. UE auto-configures link-local address using procedures as defined in RFC 4862 in case of IPv6 and in RFC 3927 in case of IPv4.

7.1.2.3 Layer-2 Link Maintenance Over PC5

The PC5 Signalling Protocol shall support keep-alive functionality that is used to detect that when the UEs are not in ProSe Communication range, so that they can proceed with implicit layer-2 link release.

> NOTE: It is left to Stage 3 to determine how and when the keep alive messages are used.

7.1.2.4 Layer-2 Link Release Over PC5

Depicted in FIG. 7.1.2.4.1 is layer-2 link release procedure over PC5. This procedure can be also used to release the layer-2 link between the Remote UE and the UE-to-Network Relay, initiated by either the Remote UE or the Relay e.g. due to temporary loss of connectivity to the network, battery running low of the relay, etc.

Figure 12:
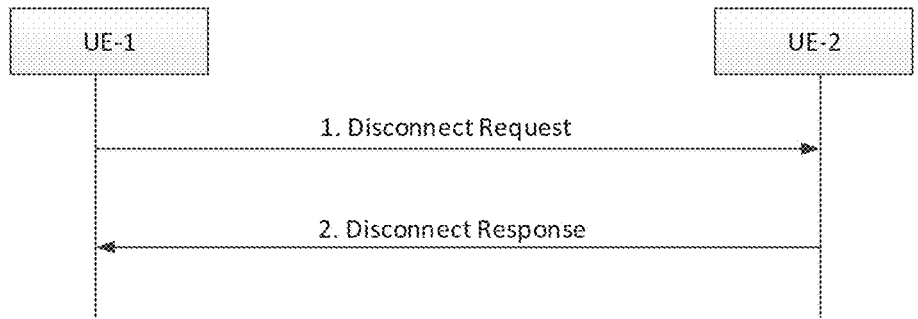
FIG. 12 is a reproduction of FIG. 7.1.2.4.1 of 3GPP TR 23.713 v1.5.0.

[FIG. 7.1.2.4.1 of 3GPP TR 23.713 v1.5.0 is reproduced as FIG. 12]

1. UE-1 sends a Disconnect Request message to UE-2 in order to release the layer-2 link and deletes all context data associated with.

2. Upon reception of the Disconnect Request message UE-2 responds with a Disconnect Response message and deletes all context data associated with the layer-2 link.

7.1.3 Impact on Existing Entities and Interfaces

Support for following PC5 functionality:
  PC5 Signalling Protocol and procedures.
  Additional mechanisms for IP address assignment.

7.1.4 Topics for Further Study for One-to-One ProSe Direct Communication

It is FFS whether the Direct Communication Request message (step 1 in FIG. 7.1.2.1.1) and the authentication messages (step 2 in FIG. 7.1.2.1.1) belong to the same or different protocols. Resolution: PC5 signalling protocol is used for both Direct Communication Request message and authentication messages.

It is FFS whether there is a need for other mechanisms for IP address assignment (e.g. to assist service continuity between the direct path and the infrastructure path between the two UEs, or for the case of an isolated (i.e. non-relay) one-to-one communication).

Resolution: service continuity between the direct path and the infrastructure path is not supported.

It is FFS whether one-to-one communication requires real-time network authorization when the two UEs are in coverage.

Resolution: in SA3 scope

It is FFS how Layer-2 ID for unicast communication is assigned to the UE, whether the same Layer-2 ID can be used for multiple layer-2 links for one-to-one communication and whether the same Layer-2 ID can be used for Source Layer-2 ID of both one-to-one and one-to-many communication. This FFS applies to both cases when bearer level security as defined by TS 33.303[11] is used and when it is not.

Layer-2 ID for unicast communication is provided to the UE during provisioning time according to the provisioning options described in clause 6.1.2.1.

The same Layer-2 ID can be used for multiple layer-2 links for one-to-one communication. The same Layer-2 ID can be used for Source Layer-2 ID of both one-to-one and one-to-many communication. Whether and how bearer layer security is applied is in SA3 scope.

The Layer-2 ID can also be self-assigned by the UE (e.g. to avoid Layer-2 ID conflict with adjacent UEs, or for ProSe UE-to-Network Relay operation).

The Layer-2 ID used as the Source Layer-2 ID in one-to-one ProSe Direct Communication frames sent from UE-1 to UE-2 is used as the Destination Layer-2 ID in the frames sent from UE-2 to UE-1.

7.1.5 Conclusions on One-to-One ProSe Direct Communication

The PC5 transport for signalling and user plane should follow the same per packet priority treatment defined in clause 7.5.1.

In general, the above solutions for direct discovery and one-to-one ProSe direct communication could also be applied to ProSe UE-to-Network Relay. 3GPP TR 23.713 v1.5.0 further specifies a relay discovery and one-to-one communication establishment procedure for ProSe UE-to-Network Relay based on the above solutions as follows:

7.2.2.1 Relay Discovery and One-to-One Communication Establishment

The ProSe UE-Network Relay may attach to the network (if not already attached) and establish a PDN connection that can be used for relaying of traffic to/from Remote UEs.

Figure 13:
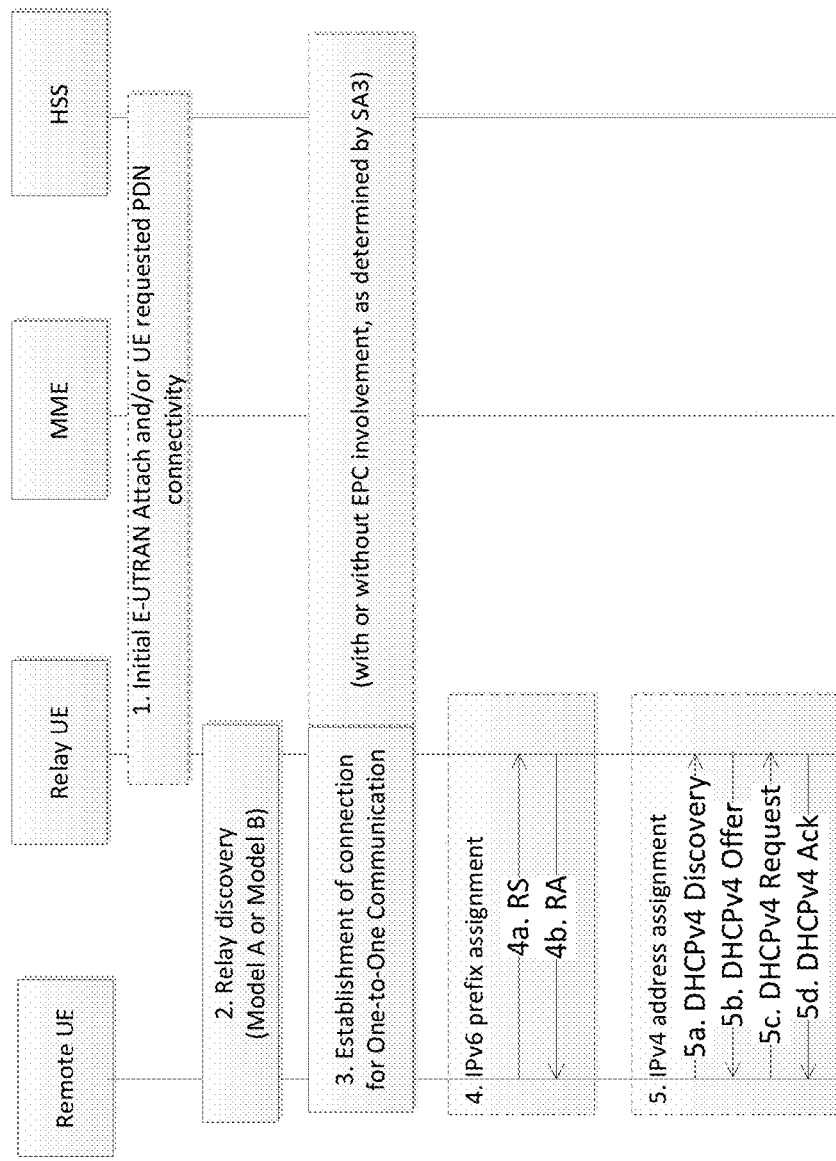
FIG. 13 is a reproduction of FIG. 7.2.2.1 of 3GPP TR 23.713 v1.5.0.

[FIG. 7.2.2.1 of 3GPP TR 23.713 v1.5.0 is reproduced as FIG. 13]

1. The ProSe UE-Network Relay performs initial E-UTRAN Attach (if not already attached) and/or establishes a PDN connection for relaying (if no appropriate PDN connection for this relaying exists). In case of IPv6, the ProSe UE-Network Relay obtains IPv6 prefix via prefix delegation function from the network as defined in TS 23.401 [7].
2. The Remote UE performs discovery of a ProSe UE-Network Relay using Model A or Model B discovery. The details of this procedure are described in clause 6.
3. The Remote UE selects a ProSe UE-Network Relay and establishes a connection for One-to-One Communication. The details of this procedure are described in clause 7.1.
    NOTE 1: Whether the authentication of the Remote UE involves the EPC will be decided by SA WG3.
4. When IPv6 is used on PC5 the Remote UE performs IPv6 Stateless Address auto-configuration, the Remote UE shall send a Router Solicitation message (step 4a) to the network using as Destination Layer-2 ID the Layer-2 ID of the Relay in order to solicit a Router Advertisement message (step 4b) as specified in IETF RFC 4862 [6]. The Router Advertisement messages shall contain the assigned IPv6 prefix. After the Remote UE receives the Router Advertisement message, it constructs a full IPv6 address via IPv6 Stateless Address auto-configuration in accordance with IETF RFC 4862 [6]. However, the Remote UE shall not use any identifiers defined in TS 23.003 [8] as the basis for generating the interface identifier. For privacy, the Remote UE may change the interface identifier used to generate the full IPv6 address, as defined in TS 23.221 [9] without involving the network. The Remote UE shall use the auto-configured IPv6 address while sending packets.
5. When IPv4 is used on PC5 the Remote UE uses DHCPv4 [10]. The Remote UE shall send DHCPv4 Discovery (step 5a) message using as Destination Layer-2 ID the Layer-2 ID of the Relay. The ProSe UE-Network Relay acting as a DHCPv4 Server sends the DHCPv4 Offer (step 5b) with the assigned Remote UE IPv4 address. When the Remote UE receives the lease offer, it sends a DHCP REQUEST message containing the received IPv4 address (step 5c). The ProSe UE-Network Relay acting as DHCPv4 server sends a DHCPACK message to the Remote UE (step 5d) including the lease duration and any other configuration information that the client might have requested. On receiving the DHCPACK message, the Remote UE completes the TCP/IP configuration process.
    NOTE 2: The DHCPv4 client may skip the DHCPv4 Discovery phase, and send DHCPv4 Request message in broadcast as the first message in accordance with the DHCPv4 renewal process.

...

7.2.5 Conclusions on ProSe UE-Network Relays
The ProSe UE-Network Relay is a Layer-3 relay (i.e. an IP router), as agreed in Rel-12 ProSe. The MBMS Relay information, TMGI, and ECGI, is sent in a Relay Discovery Additional Information Discovery message
A Relay UE supporting eMBMS traffic may transmit multiple discovery messages that contain ECGI and/or the TMGIs.

The triggering of TMGI advertisement, ECGI advertisement and establishment of the ProSe one-to-one communications links are based on the PC5 Signalling Protocol introduced in section 7.1.1.2.
The Relay selection and reselection procedure needs to consider both the upper layer discovery information defined in clause 6.1.2.1 and the radio layer information that will be defined by RAN. The interactions between these considerations at different layers are implementation specific. The ProSe Function shall be able to configure the Remote UE with a set of radio layer selection criteria for using the radio layer information in UE-to-Network Relay selection. Relay reselection when required is performed using relay selection procedure.
    NOTE: The radio level information and radio layer selection criteria will be specified by RAN WGs. Relay selection/reselection may need to be evaluated based on RAN2 work.
ProSe UE-Network Relay procedure based on what is defined in the sub-clause 7.2.2.1 should proceed to the normative work except authentication part which would be done by SA3 WG. The solution for multicast/broadcast traffic support using IP multicast on relay described in clause 7.2.2.4 is not considered for specification in Rel-13.
    3GPP TS 36.300 v12.5.0 describes the relationship between a PDN connection and EPS bearers as follows:
13 QoS
An EPS bearer/E-RAB is the level of granularity for bearer level QoS control in the EPC/E-UTRAN. That is, SDFs mapped to the same EPS bearer receive the same bearer level packet forwarding treatment (e.g. scheduling policy, queue management policy, rate shaping policy, RLC configuration, etc.) [17].
One EPS bearer/E-RAB is established when the UE connects to a PDN, and that remains established throughout the lifetime of the PDN connection to provide the UE with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer can only be taken by the EPC, and the bearer level QoS parameter values are always assigned by the EPC. An EPS bearer/E-RAB is referred to as a GBR bearer if dedicated network resources related to a Guaranteed Bit Rate (GBR) value that is associated with the EPS bearer/E-RAB are permanently allocated (e.g. by an admission control function in the eNodeB) at bearer establishment/modification. Otherwise, an EPS bearer/E-RAB is referred to as a Non-GBR bearer. A dedicated bearer can either be a GBR or a Non-GBR bearer while a default bearer shall be a Non-GBR bearer.
13.1 Bearer Service Architecture
The EPS bearer service layered architecture is depicted in FIGS. 13.1-1 below, where:
    An ULTFT in the UE binds an SDF to an EPS bearer in the uplink direction. Multiple SDFs can be multiplexed onto the same EPS bearer by including multiple uplink packet filters in the ULTFT.
    A DL TFT in the PDN GW binds an SDF to an EPS bearer in the downlink direction. Multiple SDFs can be multiplexed onto the same EPS bearer by including multiple downlink packet filters in the DL TFT.

An E-RAB transports the packets of an EPS bearer between the UE and the EPC. When an E-RAB exists, there is a one-to-one mapping between this E-RAB and an EPS bearer.

A data radio bearer transports the packets of an EPS bearer between a UE and one or more eNB(s). When a data radio bearer exists, there is a one-to-one mapping between this data radio bearer and the EPS bearer/E-RAB.

An S1 bearer transports the packets of an E-RAB between an eNodeB and a Serving GW.

An S5/S8 bearer transports the packets of an EPS bearer between a Serving GW and a PDN GW.

A UE stores a mapping between an uplink packet filter and a data radio bearer to create the binding between an SDF and a data radio bearer in the uplink.

A PDN GW stores a mapping between a downlink packet filter and an S5/S8a bearer to create the binding between an SDF and an S5/S8a bearer in the downlink.

An eNB stores a one-to-one mapping between a data radio bearer and an S1 bearer to create the binding between a data radio bearer and an S1 bearer in both the uplink and downlink.

A Serving GW stores a one-to-one mapping between an S1 bearer and an S5/S8 a bearer to create the binding between an S1 bearer and an S5/S8a bearer in both the uplink and downlink.

According to the VoLTE (Voice over LTE) voice call establishment and clearing procedures specified in the GSMA™-VoLTE Service Description and Implementation Guidelines Version 1.1 (26 Mar. 2014), establishment and release of the dedicated EPS (Evolved Packet System) bearer for VoLTE are triggered by SIP (Session Initiation Protocol) signalling between the UE and the IMS (IP Multimedia Subsystem) network. In case of UE-to-Network Relay, they are supposed to be triggered by SIP signalling between the Remote UE and the IMS network, wherein the SIP signalling is forwarded via the relay UE.

Therefore, if the layer-2 link between the remote UE and the relay UE is released (e.g., due to layer-2 link failure or relay reselection), the remote UE may not be able to initiate the clearing procedure to release the dedicated EPS bearer for VoLTE. In this situation, the dedicated EPS bearer will remain after the layer-2 link failure/release. So it would be beneficial in terms of resource efficiency for the relay UE to send a notification or request to the eNB (evolved Node B) for triggering release of the dedicated EPS bearer or the radio bearer). The notification or request could be a non-access stratum (NAS) message, wherein the NAS comprises protocols between UE and the core network that are not terminated in the UTRAN/E-UTRAN as defined in 3GPP TR 21.905. The eNB then forwards this NAS message to the core network so that the core network can initiate an EPS bearer context deactivation procedure as specified in 3GPP TS 24.301 v11.5.0.

Figure 14:
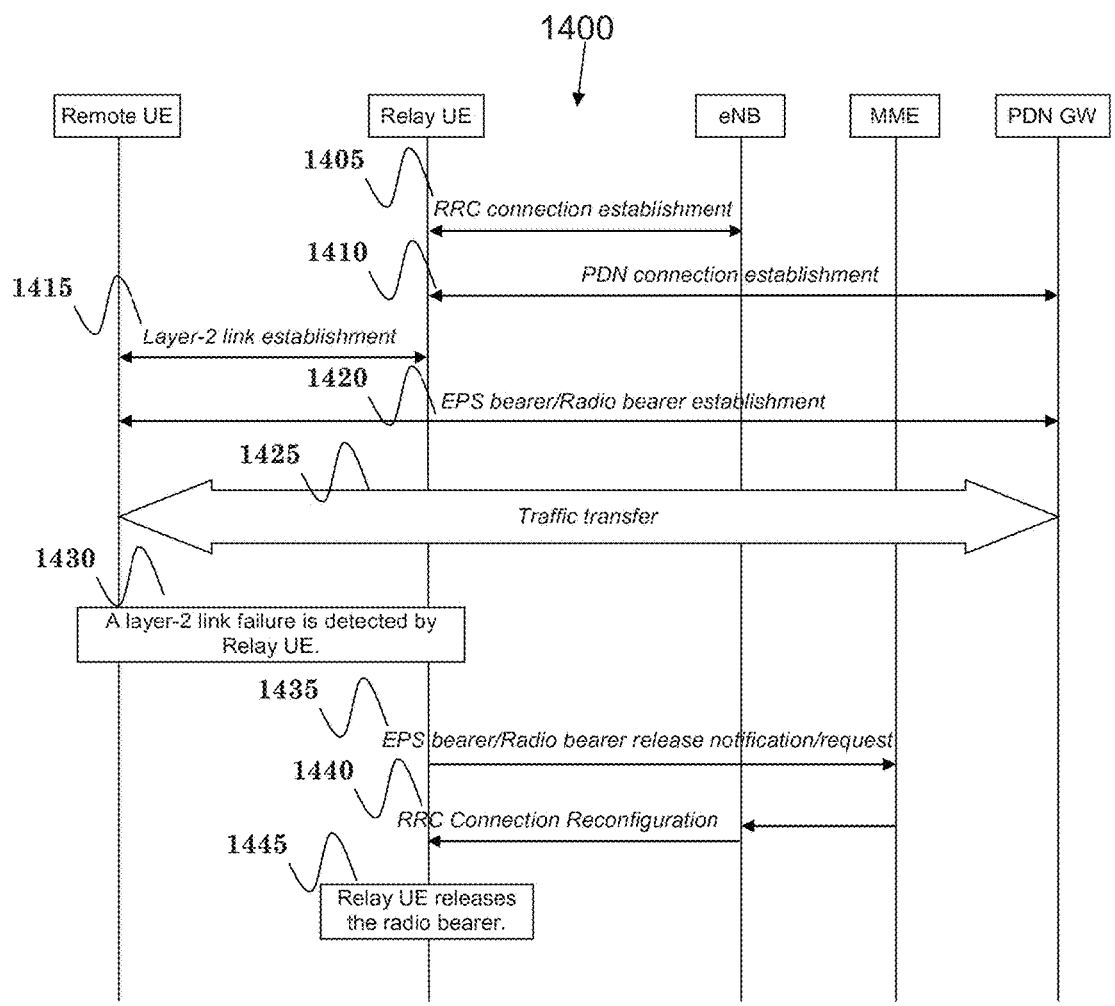
FIG. 14 is a message sequence chart according to one exemplary.

FIG. 14 shows a message sequence chart according to one exemplary embodiment. As shown in step 1405 of FIG. 14, the relay UE establishes a RRC (Radio Resource Control) connection with the eNB. In step 1410, the relay UE then establishes a PDN (Packet Data Network) connection with a PDN GW (Packet Data Network Gateway), wherein the PDN GW connects with a PDN. During the PDN connection establishment, a default EPS bearer is created for the PDN connection (e.g. for SIP signaling transmissions).

In one embodiment, the PDN connection is established between the relay UE and a PDN gateway (PDN GW).

In step 1415, the remote UE establishes a layer-2 link with the relay UE after the remote UE discovers the relay UE based on the Relay Service Code included in a discovery message broadcast by the relay UE.

In one embodiment, the layer-2 link is identified by a combination of a layer-2 identity of the relay UE and a layer-2 identity of the remote UE. Furthermore, a frame could be transmitted over the layer-2 link and could include the layer-2 identity of the relay UE and the layer-2 identity of the remote UE. In addition, the layer-2 identity of the relay UE could be a ProSe Relay UE identity, and the ProSe Relay UE identity could be associated with a Relay Service Code. In one embodiment, the Relay Service Code identifies a connectivity service the relay UE provides to the remote UE, and/or is associated with the PDN connection.

In step 1420, the relay UE creates a radio bearer between the relay UE and the eNB for forwarding data packets between the remote UE and a PDN corresponding to the PDN connection. In one embodiment, the relay UE could create the radio bearer after receiving a Radio Resource Control (RRC) message including configuration of the radio bearer from the eNB. The radio bearer could be mapped to a dedicated EPS bearer. The dedicated EPS bearer is established between the relay UE and a PDN GW connected with the PDN. In one embodiment, the dedicated EPS bearer is created during a session initiation procedure performed by upper layers of the remote UE. The PDN GW initiates the establishment of the dedicated EPS bearer based on SIP signaling sent by the remote UE. The SIP signaling is transmitted via the default EPS bearer established in step 1410. In addition, the relay UE could be in a RRC_CONNECTED state or in coverage of the eNB. Furthermore, the remote UE could be in coverage of the eNB or out of coverage of the eNB.

In one embodiment, the relay UE could send the notification or request, such as a NAS message (step 1435) to the eNB if the relay UE detects a layer-2 link failure (step 1430) or if the relay UE receives from the remote UE a Disconnect Request or a message indicating relay reselection. Furthermore, the relay UE could send the notification or request (step 1435) if no other remote UE links to the PDN connection or if no other remote UE shares the radio bearer. The notification or request could include an identity of the radio bearer or an identity of the dedicated EPS bearer.

In one embodiment, the failure of the layer-2 link could mean that layer-2 link maintenance over PC5 procedure in the relay UE (as discussed in 3GPP TR 23.713 v1.5.0) considers the remote UE is not in ProSe (Proximity-based Service) communication range of the relay UE.

In one embodiment, the relay UE could release the concerned radio bearer (step 1445) before sending the notification or request (step 1435). Alternatively, the relay UE could send the notification or request first (step 1435) and then release the concerned radio bear (step 1445) after receiving a RRC message (e.g., RRC Connection Reconfiguration) indicating release of the radio bearer from the eNB (step 1440).

Referring back to FIGS. 3 and 4, in one exemplary embodiment from the perspective of a relay UE, the device 300 includes a program code 312 stored in the memory 310. The CPU 308 could execute program code 312 to enable the relay UE (i) to connects with an evolved eNB, (ii) to establish a PDN connection for supporting traffic relaying, (iii) to establish a layer-2 link with a remote UE, (iv) to create a radio bearer between the relay UE and the eNB for forwarding data packets between the remote UE and a PDN corresponding to the PDN connection, (v) to send a notification or request (e.g., a NAS message) to the eNB if a failure of the layer-2 link is detected, and (vi) to receive a radio resource control (RRC) message indicating release of the radio bearer from the eNB. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for triggering radio bearer release by a relay user equipment (UE), comprising:
   the relay UE connects with an evolved Node-B (eNB);
   the relay UE establishes a Packet Data Network (PDN) connection for supporting traffic relaying;
   the relay UE establishes a layer-2 link with a remote UE;
   the relay UE creates a radio bearer between the relay UE and the eNB for forwarding data packets between the remote UE and a PDN corresponding to the PDN connection; and
   the relay UE sends a non-access stratum (NAS) message to the eNB if a failure of the layer-2 link is detected, wherein the NAS message is used to trigger release of a dedicated Evolved Packet System (EPS) bearer mapped to the radio bearer.

2. The method of claim 1, wherein the PDN connection is established between the relay UE and a PDN gateway (PDN GW).

3. The method of claim 1, wherein the layer-2 link is identified by a combination of a layer-2 identity of the relay UE and a layer-2 identity of the remote UE.

4. The method of claim 3, wherein the layer-2 identity of the relay UE is a ProSe (Proximity-based Service) Relay UE identity.

5. The method of claim 4, wherein the ProSe Relay UE identity is associated with a Relay Service Code.

6. The method of claim 5, wherein the Relay Service Code identifies a connectivity service the relay UE provides to the remote UE, and the Relay Service Code is associated with the PDN connection.

7. The method of claim 1, wherein the relay UE releases the radio bear before sending the NAS message, or releases the radio bear after sending the NAS message and receiving a Radio Resource Control (RRC) message indicating release of the radio bearer in response to transmission of the NAS message from the eNB.

8. The method of claim 1, wherein the relay UE creates the radio bearer after receiving a Radio Resource Control (RRC) message including configuration of the radio bearer from the eNB.

9. The method of claim 1, wherein the failure of the layer-2 link means layer-2 link maintenance over PC5 procedure in the relay UE considers the remote UE is not in ProSe (Proximity-based Service) communication range of the relay UE.

10. A relay User Equipment (UE) for triggering radio bearer, comprising:
 a control circuit;
 a processor installed in the control circuit; and
 a memory installed in the control circuit and operatively coupled to the processor;
 wherein the processor is configured to execute a program code stored in the memory to enable the relay UE to:
  connect with an evolved Node-B (eNB);
  establish a Packet Data Network (PDN) connection for supporting traffic relaying;
  establish a layer-2 link with a remote UE;
  create a radio bearer between the relay UE and the eNB for forwarding data packets between the remote UE and a PDN corresponding to the PDN connection; and
  send a non-access stratum (NAS) message to the eNB if a failure of the layer-2 link is detected, wherein the NAS message is used to trigger release of a dedicated Evolved Packet System (EPS) bearer mapped to the radio bearer.

11. The relay UE of claim 10, wherein the PDN connection is established between the relay UE and a PDN gateway (PDN GW).

12. The relay UE of claim 10, wherein the layer-2 link is identified by a combination of a layer-2 identity of the relay UE and a layer-2 identity of the remote UE.

13. The relay UE of claim 12, wherein the layer-2 identity of the relay UE is a ProSe (Proximity-based Service) Relay UE identity.

14. The relay UE of claim 13, wherein the ProSe Relay UE identity is associated with a Relay Service Code.

15. The relay UE of claim 14, wherein the Relay Service Code identifies a connectivity service the relay UE provides to the remote UE, and the Relay Service Code is associated with the PDN connection.

16. The relay UE of claim 10, wherein the relay UE releases the radio bear before sending the NAS message, or releases the radio bear after sending the NAS message and receiving a Radio Resource Control (RRC) message indicating release of the radio bearer in response to transmission of the NAS message from the eNB.

17. The relay UE of claim 10, wherein the relay UE creates the radio bearer after receiving a Radio Resource Control (RRC) message including configuration of the radio bearer from the eNB.

18. The relay UE of claim 10, wherein the failure of the layer-2 link means layer-2 link maintenance over PC5 procedure in the relay UE considers the remote UE is not in ProSe (Proximity-based Service) communication range of the relay UE.

* * * * *